H. L. TANNER.
GYROSCOPIC COMPASS.
APPLICATION FILED MAY 15, 1915.

1,309,591.

Patented July 8, 1919.
2 SHEETS—SHEET 1.

INVENTOR.
HARRY L. TANNER
BY Herbert H. Thompson,
ATTORNEY.

H. L. TANNER.
GYROSCOPIC COMPASS.
APPLICATION FILED MAY 15, 1915.

1,309,591.

Patented July 8, 1919.
2 SHEETS—SHEET 2.

INVENTOR.
HARRY L. TANNER
BY Herbert H. Thompson
ATTORNEY.

UNITED STATES PATENT OFFICE.

HARRY LAURENCE TANNER, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC COMPASS.

1,309,591.

Specification of Letters Patent.

Patented July 8, 1919.

Application filed May 15, 1915. Serial No. 28,266.

*To all whom it may concern:*

Be it known that I, HARRY LAURENCE TANNER, a citizen of the United States of America, residing at Brooklyn, New York, have invented certain new and useful Improvements in Gyroscopic Compasses, of which the following is a specification.

This invention relates to gyroscopic direction indicating instruments, and more especially to the type of such apparatus which has a positive directive power, that is an instrument which will seek the meridian, if displaced.

One object of this invention is to construct an entirely new type of gyroscopic compass in which the sources of error in all the present types of compasses are eliminated by the fundamental principles of design rather than by compensating attachments. Among the principal sources of deviation in the existing types of compasses may be mentioned friction about the vertical and horizontal axes of the gyroscope or gyroscopes and rolling of the ship, especially on an intercardinal course.

Another object of the invention is to simplify the construction of gyro-compass by eliminating the necessity for auxiliary stabilizing gyroscopes, which add little or nothing to the directive force of the compass.

Figure 1:
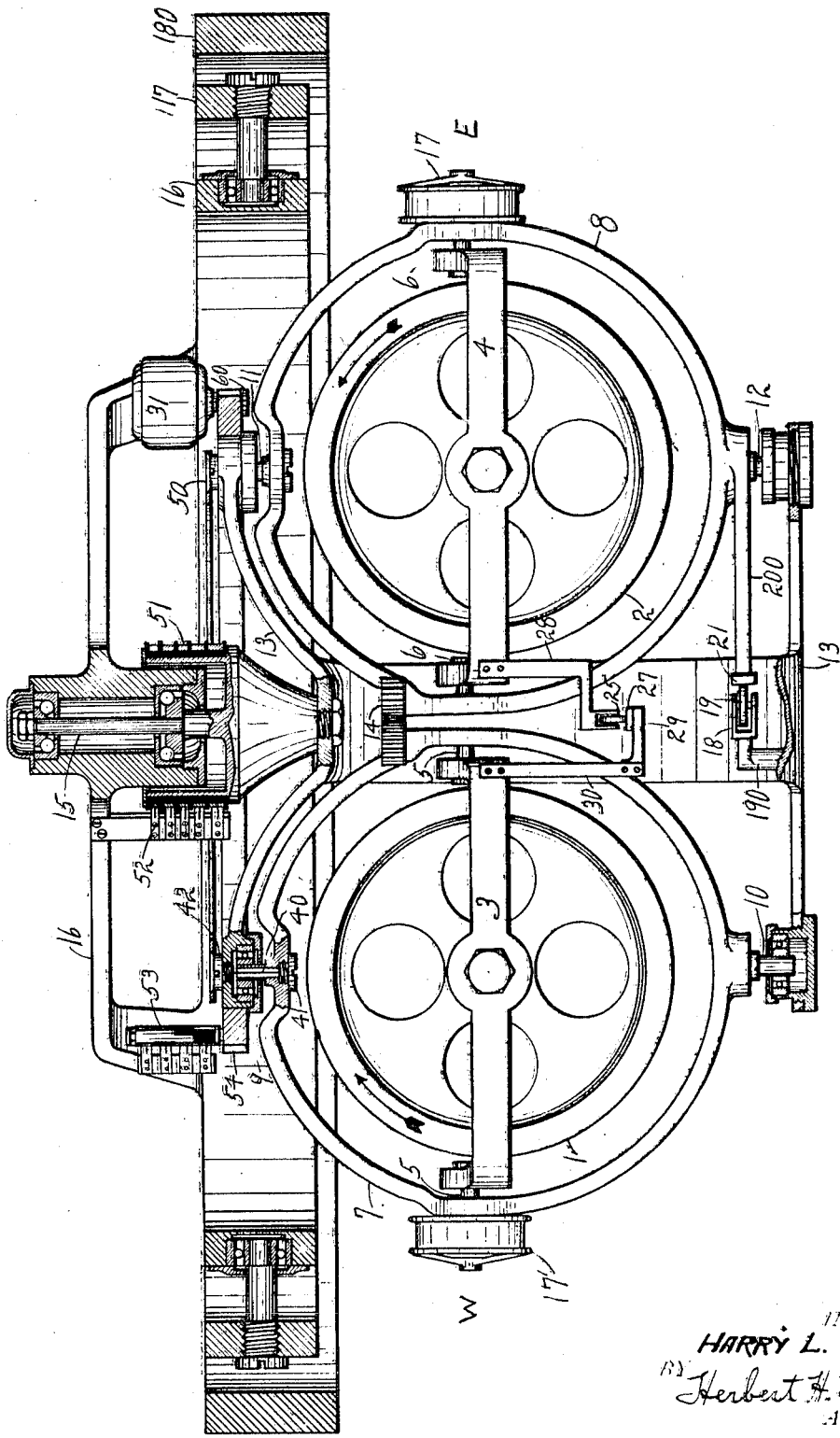
Figure 2:
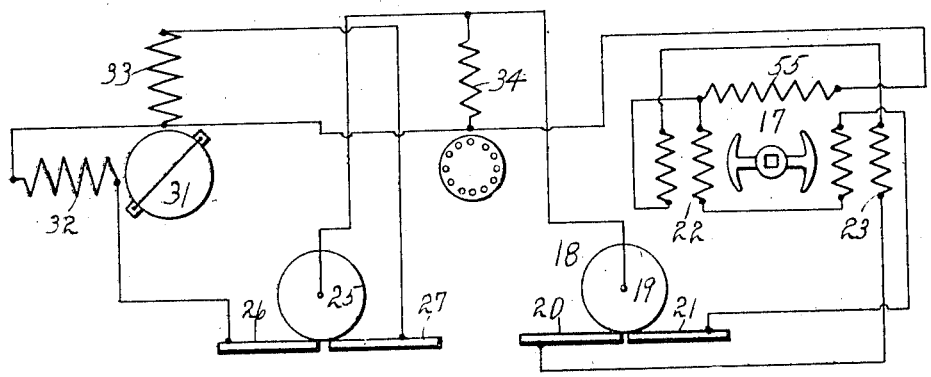
Figure 3:
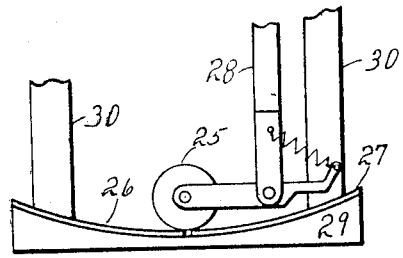
Figure 4:
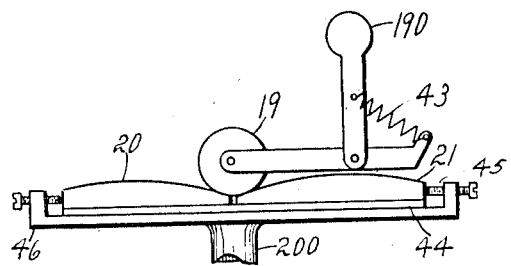
Figure 5:
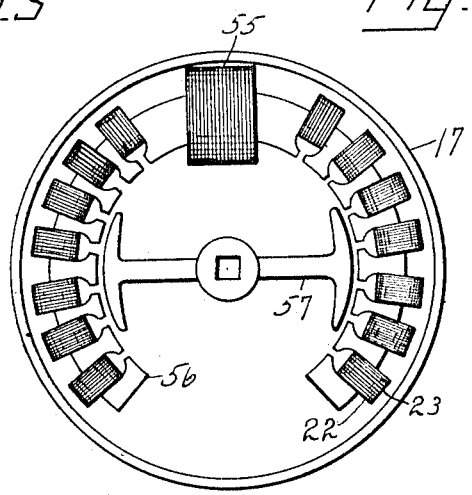
Figure 6:
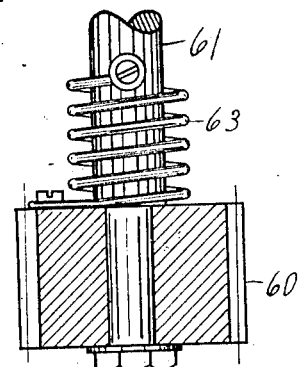

Referring to the drawings, in which what I now consider to be a preferred form of my invention is illustrated; Figure 1 is the south elevation partly in section of a complete compass, parts of which, however, are shown diagrammatically rather than as actually constructed. Fig. 2 is an elementary wiring diagram of a portion of the compass. Figs. 3 and 4 are details of electrical contacts. Fig. 5 is an enlarged view of a special form of motor which I employ. Fig. 6 is a detail of the connection between one of the motors and the main compass frame.

According to my invention, I employ a plurality of rotors, preferably two, adapted to oppose each other in some respects and to aid each other in other respects. These rotors are, preferably, adapted to be spun electrically, as by making them the rotors of an induction motor such as shown in the British patent to E. A. Sperry #15,669, July 5, 1912, but in order to illustrate more clearly the scientific principles of my invention, the rotors are shown simply as fly wheels 1 and 2 with the spinning axes mounted in frames 3 and 4. Each rotor is mounted for independent oscillation about a horizontal axis as by pivoting frames 3 and 4 on pivots 5 and 6 in a pair of vertical rings 7 and 8. Pivots 5 and 6 are positioned well above the center of gravity of the rotors and their casings so that each rotor, if driven in the proper direction, will operate as a compass. The supporting rings 7 and 8 are symmetrically located and rotatably mounted on vertical pivots 9, 10, 11 and 12 in a common supporting frame 13, so as to be free to turn or precess with respect thereto, but are interconnected for predetermined relative movements. In the form of the invention illustrated, the gyroscopes are connected so that they can turn only in opposite directions, as by gearing them together at 14. The frame 13 is in turn mounted on a vertical pivot 15 in a supporting spider 16, which may be supported in any suitable manner, as by means of gimbal rings 117 and 180. The compass card 50 is mounted on frame 13.

In this form of the invention the opposite action of the gyroscopes is obtained by rotating them in opposite directions. While I am aware that heretofore the advantages of utilizing oppositely rotating gyros in gyroscopic apparatus has been recognized and even that such gyros have been used in the gyro-navigational instruments of the non-directive type, I claim that I am the first to conceive how oppositely rotating gyros may be utilized to produce a positive, meridian seeking instrument. I accomplish the result as follows:

If the rotation of the gyros assumes the direction indicated by the arrows, it will at once be seen that rotor 1 will act within frame 13 as a true gyroscopic compass, and that friction about the vertical axis will cause the top to precess out from the plane of the paper. The behavior of rotor 2 will be quite different, however. It will be seen that the effect of gravitation acting on the pendulous frame will be to cause the gyroscope to tend to precess farther away from the meridian, in case it was slightly disturbed. In other words, the gyroscope may be said to be in a condition comparable to unstable equilibrium, such as a magnetic compass needle, which is placed with its north end pointing south.

I provide a means, however, for utilizing this unstable tendency and converting it into a positive directive force substantially equal in power to that of the other gyroscope. To this end, means are provided for directly or indirectly causing a torque to be applied about the horizontal axis of said gyroscope on its turning away from its normal position within the vertical frame 8, the direction of the torque being opposite to the torque exerted by gravity on the other gyroscope. This means may comprise an electromagnetic torque applying device 17 adapted to exert a torque about the horizontal axis 6 of the gyro. Said device is controlled from a contact mechanism 18 which is operated by movement of the gyro about axis 11—12. It may comprise a trolley or brush 19 mounted on a post 190 on frame 13 and a pair of reversing contacts 20 and 21 mounted on an arm 200 extending from ring 8 so as to turn therewith. The contacts are so connected with the armature coils 22 and 23 of motor 17 that the torque is reversed when trolley 19 crosses from one contact to the other and so that zero torque is applied when the trolley is touching both contacts. The specific construction of motor 17 and of contacts 18 which I prefer to employ will be described hereinafter.

The effect of this torque applying device is as follows: As soon as the gyro starts to precess away from the meridian, due to the causes stated above, contact 20 or 21 operates to cause motor 17 to exert a torque about horizontal axis 6. This torque is so adjusted as to oppose and more than overbalance the couple due to gravity, so that it will cause the gyro to precess back toward the meridian. But such a movement about pivots 11 and 12 is prevented by the connection 14, which allows only opposite precession about axes 9, 10 and 11, 12. Hence the entire outer frame 13 will be turned by these reactions on pivot 15 into the E. W. plane, as illustrated.

This general method of converting this unstability of a gyro into a stable, directive force is applicable also to gyroscopes which are rendered unstable by other means than by reversing the direction of rotation of a pendulous gyro. For instance it is equally applicable to a gyroscope in which this condition is attained through shifting the position of the center of gravity of the gyro. This application of my invention is shown in the joint application of Herbert H. Thompson and myself Serial No. 30854, filed May 27, 1915.

I also provide my compass with another set of contacts which may also be in the form of a trolley 25 and a pair of reversing contacts 26 and 27. This set is so secured to the gyro frames as to be relatively moved by opposite precession of the two gyros about their horizontal axes. For example, the trolley may be mounted on an arm 28 secured to ring 4, while contacts 26 and 27 may be mounted on a block 29 secured to arms 30 on ring 3 (see also Fig. 3). The motor 31 which is controlled from said contacts is mounted so as to exert a torque on the main frame 13 about its vertical axis and to rotate it at times. Motor 31 may be connected to the frame by a pinion 60 and a large gear 54 on top of the frame. Preferably, a yielding connection is interposed between the motor and the frame such as by loosely mounting the pinion 60 on the motor shaft 61 and joining it thereto by a spring 63. The spring 63 not only cushions the frame 13 against sudden shocks due to the reversing of the motor 31, but also aids in maintaining said frame in a state of continuous oscillation. This vibratory or oscillatory action is important in eliminating the initial or static friction of the vertical bearings of the individual gyroscopes within the frame 13, and also eliminating like friction due to the trolley 19. In gyroscopic compasses it is of prime importance to avoid all possible friction about the vertical axis. I am aware that prior workers have recognized the importance of this feature, and have imparted oscillatory movements between the gyroscope and the frame containing the vertical guide bearing. By employing a resilient connection 63 between the motor 31 and the frame 13, I have eliminated the necessity of employing a reversing relay between the contacts on the gyro and the motor for this purpose, as has heretofore been thought necessary. Motor 31 is preferably a repulsion motor provided with two field windings 32, 33 so positioned with respect to the rotor and so connected with contacts 26 and 27 as to reverse the rotor when trolley 25 crosses from one to the other (Fig. 2). Current may be supplied from any source such as alternator 34 for both sets of contacts and motors.

One function of motor 31 is to overcome the effect of friction about the vertical axis, and to assist the gyroscopes in turning the main frame 13 into the east-west plane. If the ship should turn, for instance, any friction about the vertical axis 15 would cause equal and opposite precession on axes 5 and 6 and hence cause contact of trolley 25 with contact 26 or 27 and operate motor 31, which would apply a torque counterbalancing the torque due to friction. Suppose now that the frame 13 is out of the east-west plane. The earth's rotation will then cause the spinning axis of both gyros to become inclined but inclined equally and not relatively, so that motor 31 would not be actuated thereby.

The gyros would then exert a torque tending to turn frame 13 into the east-west plane. Any opposition to this torque from whatever cause, such as inertia of the frame and connected parts or friction, will cause relative precession of the gyros, thereby operating contacts 25—27 and causing motor 31 to assist the gyros in turning the frame.

In order to provide an effective damping means for my compass, I prefer to employ one or more yielding, centralizing devices, which are brought into action by the relative displacement of the gyros with respect to the frame 13 and which exert a torque about the vertical axes 9, 10, 11, 12. One method of accomplishing this result is to make either one of the pivots 9 or 11 or both in the form of torsion suspension wires 40 which support the frames 7 and 8 from frame 13. The ends of each wire are preferably secured to a pair of screws 41 and 42, which may be adjusted to properly centralize the gyros.

By this adjustment another novel result may be secured. In this form of gyroscopic compass, principally on account of the remarkable strength and effectiveness of the damping means employed, I find it desirable to shift the position at which the gyros centralize for different latitudes. A convenient means for accomplishing this result is afforded by screws 41 and 42, either or both of which may be turned so as to place a slight twist in the wire.

A further damping means, which may be employed in place of the one above described, but which I prefer to employ in connection therewith, is provided by so shaping the contacts 20 and 21 above referred to (Fig. 4) that the trolley 19, under the influence of spring 43 will exert a centralizing effect on frame 8. In connection with this form of damper, I may also provide a means for correcting for different latitudes. For this purpose I mount contacts 20 and 21 on a block 44 which is adjustable on arm 200. Screws 45, threaded in extensions 46 from arm 200 provide a convenient means for adjusting the contact. It will be seen that the principle of operation of both devices is the same.

The compass is provided with slip rings 51 and brushes 52 to bring in current to the rotors 1 and 2 and to motors 17, 17' and 31. A transmitter 53 driven by the large gear 54 through which motor 31 turns frame 13, is also provided so as to transmit the readings of the master compass to the repeaters in the well known manner.

Motor 17' may be a duplicate of motor 17 and is used instead of motor 17 in case the direction of rotation of both wheels is reversed. Also, if desired, it may be used when the wheels are operating as shown. In such case, it is preferably connected so as to act in the same direction as gravity and thus aid gravity, or it may be connected so as to oppose gravity, but in the latter case it should be made much weaker than gravity.

The form of construction I prefer to employ for motor 17 is shown in Fig. 5. It possesses several novel features in that the field 55 and armature windings 22, 23 are both stationary and preferably wound on the same core 56. The rotor 57 is without windings and consists simply of a soft iron core, which may be connected directly to an extending squared portion of axle 6. The motor windings are so connected with contacts 20 and 21 that the magnetic flux is shifted when the trolley rolls from one contact to the other, thereby exerting a torque on core 57. In the arrangement shown, this is accomplished by providing two opposed windings 22 and 23 on the armature, connected with the contacts 20 and 21 respectively, so that the direction of current flow will be reversed when the trolley passes from one to the other. When the trolley is on both contacts, the current flowing through both windings in opposite directions will have little or no magnetic effect. Motor 17 will operate on either direct or alternating current, the latter being preferred in the use indicated. Such a motor will not, of course, make more than one revolution, but it will exert a substantially constant torque on a body which has great resistive power and in such capacity finds especial application to gyroscopes, for in these instruments no movement takes place in the direction of the applied torque, but only at right angles thereto.

In accordance with the provisions of the patent statutes, I have herein described the principle of operation of my invention, together with the apparatus which I now consider to represent the best embodiment thereof; but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. For instance, while I prefer to make both gyroscopes pendulous, it is quite conceivable that one of the gyros be balanced about its horizontal axis, and dependence had upon the torque applying device 17 to furnish the equivalent of the usual ballistic.

Having described my invention, what I claim and desire to secure by Letters Patent is:

1. A meridional gyroscopic apparatus including a pair of oppositely rotated gyroscopes.

2. In a meridional indicator, a pair of meridian seeking devices placed so as to oppose each other, and means for overcoming the opposing tendency of one of the devices.

3. In a meridional indicator, a pair of meridian seeking devices placed so as to oppose each other, and means for converting the opposing tendency of one of the devices so as to aid the other device in seeking the meridian.

4. In a gyro-compass, a pair of meridian seeking gyroscopes interconnected so as to oppose each other, and means for utilizing the opposing tendency of one gyroscope to aid the other gyroscope in seeking the meridian.

5. In a gyro-compass, the combination with a meridian seeking gyroscope, of means responsive to turning of the gyroscope about the vertical axis for causing it to seek the meridian in a position at a substantial angle to its normal position.

6. In a gyro-compass, the combination with a meridian seeking gyroscope, of means for mounting the same to turn about a vertical and horizontal axis, and means responsive to turning of the gyroscope about the vertical axis adapted to exert a torque about the horizontal axis for causing it to seek the meridian in a position at a substantial angle to its normal position.

7. In a gyro-compass, a support pivotally mounted to turn about a vertical axis, a pair of gyroscopes, means whereby the same are mounted in said frame and connected for opposite turning about vertical pivots and for oscillation about horizontal pivots at an angle to the normally horizontal spinning axes.

8. In a gyro-compass, a support pivotally mounted to turn about a vertical axis, a pair of gyroscopes, means whereby the same are mounted in said frame and connected for opposite turning about vertical pivots and for oscillation about horizontal pivots at an angle to the normally horizontal spinning axes, and means responsive to said turning axes for exerting a torque on one of said gyroscopes about a horizontal axis.

9. In a gyro-compass, a support pivotally mounted to turn about a vertical axis, a pair of gyroscopes, means whereby the same are mounted in said frame and connected for opposite turning about vertical axes and for oscillation about horizontal axes at an angle to the normally horizontal spinning axes, and means responsive to relative oscillations about said horizontal axes for exerting a torque about the vertical axis of said support.

10. In a gyro-compass, a support pivotally mounted to turn about a vertical axis, a pair of gyroscopes, means whereby the same are mounted in said frame and connected for opposite turning about vertical axes and for oscillation about horizontal axes at an angle to the normally horizontal spinning axes, means responsive to said turning for exerting a torque on one of said gyroscopes about its horizontal axis of oscillation, and means responsive to the relative oscillations about said horizontal axes for exerting a torque about the vertical axis of said support.

11. In a meridian seeking gyroscopic apparatus, a support mounted for orientation, a pair of oppositely acting gyroscopes mounted thereon, and means interconnecting said gyroscopes and the support for obtaining a meridian seeking action.

12. In a gyro compass, the combination with a support mounted for orientation, of a plurality of gyro rotors and rotor bearing frames, and means for mounting said frames on said support for turning about vertical pivots and for oscillation about horizontal pivots.

13. In a gyro compass, the combination with a support mounted for orientation, of a plurality of gyro rotors and rotor bearing frames, means for mounting said frames on said support for turning about vertical pivots and for oscillation about horizontal pivots, and means interconnecting said gyroscopes adapted to transmit predetermined movements within the frame to the support.

14. In a gyro-compass, a pivotally mounted supporting frame, a plurality of gyroscopes mounted therein for relative movement with respect thereto and a damping means therefor comprising a yielding means responsive to a change of position of either gyroscope with respect to the frame.

15. In a gyro-compass, a pivotally mounted supporting frame, a gyroscope mounted therein for relative movement with respect thereto and an electrical contact between said gyroscope and frame adapted to exert a yielding centralizing pressure when displaced.

16. In a gyro-compass, a support pivotally mounted about a vertical axis, a pair of gyroscopes, means for mounting said gyroscopes on said support for rotation about independent vertical and horizontal axes at an angle to their normally horizontal spinning axes, means for connecting said gyroscopes allowing only equal and opposite rotation about said vertical axes, means responsive to the relative movement of the two gyroscopes for exerting a torque about the vertical axis of said support and means responsive to their conjoint movement relative to the frame for exerting a torque about a horizontal axis.

17. In a gyro-compass, a support pivotally mounted about a vertical axis, a pair of gyroscopes mounted thereon and connected for opposite turning about vertical pivots and for independent oscillation about horizontal pivots at an angle to the normally horizontal spinning axes, and centralizing means for the gyroscopes.

18. In gyro apparatus, a gyroscope, means whereby the same is supported to turn about an axis in unstable equilibrium, and for precession about a second axis, and means responsive to precessional movement of said gyroscope about said second axis for exerting a torque thereon about said first named axis.

19. In an electrical means for controlling gyroscopes, the combination with a gyroscope of a commutator adapted to be actuated by movement of the gyro about one axis, a motor in circuit with such commutator connected to exert a torque about an axis at an angle to said other axis comprising a stationary field coil, a stationary armature coil adapted to vary the magnetic flux produced by the field coil and a magnetic rotor.

20. A gyro-compass comprising a support mounted for rotation about an axis, a plurality of gyroscopes, means for pivotally mounting the same thereon about axes parallel to said first named axis and other axes perpendicular thereto, means connecting said gyroscopes so as to restrain their movement about said parallel axes and means responsive to relative movement of the gyroscopes about said perpendicular axes for aiding the gyroscopes in turning the support.

21. In a meridian gyroscopic apparatus, a support, gyroscope, means for pendulously mounting the same on said support on horizontal and vertical pivots, a second gyroscope, means for mounting the same on similar pivots, means for coupling said gyroscopes about their vertical axes, and means for causing a torque to be applied to one of said gyroscopes similar but in the opposite direction to that exerted by gravity on a pendulous gyroscope.

22. In a meridian gyroscopic apparatus, a support, a gyroscope, means for pendulously mounting the same on said support on horizontal and vertical pivots, a second gyroscope, means for mounting the same on similar pivots, means for coupling said gyroscopes about their vertical pivots, and means for causing a torque to be applied to one of said gyroscopes similar, but in the opposite direction, to that exerted by gravity on a pendulous gyroscope, said means being controlled by precession of said gyroscopes about their vertical axes.

23. In a meridian gyroscopic apparatus, the combination with a gyroscope mounted with three degrees of freedom, of means for providing it with artificial ballistic properties comprising contacts adapted to be moved by precession of said gyro about its vertical axis and an electrical device controlled by said contacts for applying a torque about the horizontal axis of the gyro.

24. In gyroscopic apparatus, a frame, a plurality of gyroscopes mounted on said frame, means for coupling said gyroscopes for opposite precession, a pair of reversing contacts and a spring pressed trolley, one of which is mounted on a gyroscope so as to be moved relatively to the other on precession of the gyroscope, said contacts being so shaped as to centralize the gyroscopes.

25. In gyroscopic apparatus, a frame, a plurality of gyroscopes mounted on said frame and means for coupling said gyroscopes for opposite precession, a pair of reversing contacts and a spring pressed trolley, one of which is mounted on a gyroscope so as to be moved relatively to the other on precession of the gyroscope, said contacts being so shaped as to centralize the gyroscopes, and means whereby the normal position of said contacts may be shifted to correspond to different latitudes.

26. In a gyro compass, the combination with a support mounted for orientation, of a plurality of gyro rotors and rotor bearing frames, means for mounting said frames on said support for turning about vertical pivots, including a torsion suspension, and means for adjusting said suspension for different latitudes.

27. In a meridian seeking gyroscopic apparatus, a support mounted for orientation, a plurality of gyroscopes mounted thereon for turning about vertical pivots within the support, and means brought into action by such turning for damping the oscillations of the apparatus about the meridian.

28. In an electrical means for controlling gyroscopes, the combination with a gyroscope of a commutator adapted to be actuated by movement of the gyro about an axis, a motor in circuit with such commutator connected to exert a torque about an axis at an angle to said other axis comprising a plurality of stationary windings, an armature without windings, a portion of said windings being so connected with said commutator that the current is reversed on actuation of said commutator, while the current through another portion of said windings remains substantially unaffected.

29. In a gyro-compass, the combination with a support mounted for orientation, a reversible motive means connected to said support for turning the same, resilient means in the connections between said means and support, a gyroscope mounted for turning upon said support, and reversing contacts relatively displaceable by such turning for actuating said motive means.

30. In a gyro compass, the combination with a support, of a gyroscope, bearings guiding said gyroscope for rotation on said support and means yieldingly connected to said support for maintaining said support and gyroscope in a state of continuous vibration.

31. In a gyro compass, a support pivotally mounted about a vertical axis, a pair of gyros mounted thereon and connected for opposite precession about vertical axes and for independent oscillation about horizontal axes, said gyros being so designed that torques about the vertical axis due to rolling of the ship will cause opposite precession about their horizontal axes, and means brought into action by said relative precession for exerting a counteractive torque about a vertical axis.

32. In a gyro compass, the combination with a support mounted for orientation, of a plurality of gyro rotors and rotor bearing frames, means for mounting said frames on said support for turning about vertical pivots, resilient centralizing means for said gyroscopes and means whereby said means may be adjusted to vary the centralized position of a gyroscope to compensate for changes in latitude.

In testimony whereof, I have signed my name to this specification this 14th day of May 1915.

HARRY LAURENCE TANNER.